US009847183B2

(12) United States Patent
Chung et al.

(10) Patent No.: US 9,847,183 B2
(45) Date of Patent: Dec. 19, 2017

(54) NANO-POROUS ELECTRODE FOR SUPER CAPACITOR AND MANUFACTURING METHOD THEREOF

(75) Inventors: Chanhwa Chung, Seoul (KR); Myung Gi Jeong, Seoul (KR); Serhiy Cherevko, Gyeonggi-do (KR)

(73) Assignee: SUNGKYUNKWAN UNIVERSITY FOUNDATION FOR CORPORATE COLLABORATION, Gyeonggi-Do (KR)

(*) Notice: Subject to any disclaimer, the term of this patent is extended or adjusted under 35 U.S.C. 154(b) by 836 days.

(21) Appl. No.: 13/978,051

(22) PCT Filed: Jan. 6, 2012

(86) PCT No.: PCT/KR2012/000137
§ 371 (c)(1),
(2), (4) Date: Aug. 14, 2013

(87) PCT Pub. No.: WO2012/093880
PCT Pub. Date: Jul. 12, 2012

(65) Prior Publication Data
US 2013/0321983 A1    Dec. 5, 2013

(30) Foreign Application Priority Data
Jan. 6, 2011 (KR) .................. 10-2011-0001495

(51) Int. Cl.
*C25D 1/16* (2006.01)
*C25D 13/22* (2006.01)
(Continued)

(52) U.S. Cl.
CPC ............... *H01G 11/26* (2013.01); *C25D 1/16* (2013.01); *C25D 5/48* (2013.01); *C25D 13/02* (2013.01);
(Continued)

(58) Field of Classification Search
CPC ................... C25D 11/18; C25D 1/20
(Continued)

(56) References Cited

U.S. PATENT DOCUMENTS 2,470,775 A * 5/1949 Ceresa ..................... C25D 5/18
205/103
6,066,527 A    5/2000 Kudelka et al.
(Continued)

FOREIGN PATENT DOCUMENTS

JP    5-45947 A    2/1993
JP    5-198461 A    8/1993
(Continued)

OTHER PUBLICATIONS

Machine translation of JP 06-065779.*
(Continued)

*Primary Examiner* — Brian W Cohen
(74) *Attorney, Agent, or Firm* — Hultquist, PLLC; Steven J. Hultquist

(57) ABSTRACT

The present invention relates to a nano-porous electrode for a super capacitor and a manufacturing method thereof, and more specifically, to a nano-porous electrode for a super capacitor and a manufacturing method thereof wherein pores are formed on the surface or inside an electrode using an electrodeposition method accompanied by hydrogen generation, thereby increasing the specific surface area of the electrode and thus improving the charging and discharging capacity, energy density, output density, and the like of a capacitor. The method for manufacturing a nano-porous electrode for a super capacitor according to the present invention manufactures a nano-porous electrode using hydrogen generated by the electrodeposition as a template to minimize the amount of metal used, so that electrode manufacturing costs can be sharply reduced, the specific surface (Continued)

area of the electrode can be adjusted by a simple process, and also the charging and discharging capacity, energy density, output density, and the like of a capacitor can be improved by increasing the specific surface area.

6 Claims, 5 Drawing Sheets

(51) Int. Cl.
  *C25D 13/02*  (2006.01)
  *H01G 11/26*  (2013.01)
  *C25D 5/48*  (2006.01)
  *H01G 11/24*  (2013.01)

(52) U.S. Cl.
  CPC ............. *C25D 13/22* (2013.01); *H01G 11/24* (2013.01); *Y02E 60/13* (2013.01)

(58) Field of Classification Search
  USPC .................................................. 205/271–280
  See application file for complete search history.

(56) References Cited

U.S. PATENT DOCUMENTS

| | | | | |
|---|---|---|---|---|
| 2003/0134171 | A1* | 7/2003 | Sarkar | C04B 38/06 429/466 |
| 2009/0159451 | A1* | 6/2009 | Tomantschger | C25D 1/00 205/96 |
| 2010/0193365 | A1* | 8/2010 | Lopatin | C25D 3/38 205/111 |
| 2011/0262764 | A1 | 10/2011 | Arai et al. | |

FOREIGN PATENT DOCUMENTS

| | | |
|---|---|---|
| JP | 6-65775 A | 3/1994 |
| JP | 6-65779 A | 3/1994 |
| JP | 7-157892 A | 6/1995 |
| JP | 2005-334827 A | 12/2005 |
| JP | 2006-510172 A | 3/2006 |
| JP | 2007-63598 A | 3/2007 |
| JP | 2007-66819 A | 3/2007 |
| JP | 2008-252019 A | 10/2008 |
| JP | 2009-246197 A | 10/2009 |
| KR | 10-0787685 B1 | 12/2007 |
| WO | 2004054015 A2 | 6/2004 |
| WO | 2010061736 A1 | 6/2010 |

OTHER PUBLICATIONS

Machine translation of JP 2007-063598.*
Rafailovic, L. D. et. al. "Study of the Dendritic Growth of Ni-Co alloys Electrodeposited on Cu Substrates" Journal of the Electrochemical Society, 157, (5), D295-D301, 2010.*

* cited by examiner

NANO-POROUS ELECTRODE FOR SUPER CAPACITOR AND MANUFACTURING METHOD THEREOF

CROSS-REFERENCE TO RELATED APPLICATIONS

This application is a U.S. national phase under the provisions of 35 U.S.C. §371 of International Patent Application No. PCT/KR12/00137 filed Jan. 6, 2012, which in turn claims priority of Korean Patent Application No. 10-2011-0001495 filed Jan. 6, 2011. The disclosures of such international patent application and Korean priority patent application are hereby incorporated herein by reference in their respective entireties, for all purposes.

TECHNICAL FIELD

The present invention relates to a nano-porous electrode for a super capacitor and a manufacturing method thereof, and more specifically, to a nano-porous electrode for a super capacitor and a manufacturing method thereof wherein pores are formed on the surface of or inside an electrode using an electrodeposition method accompanied by hydrogen generation, thereby increasing the specific surface area of the electrode and thus improving the charging and discharging capacity, energy density, power density of a capacitor, and the like.

BACKGROUND ART

In general, a high-performance portable power supply has been used as a main component of end-products essentially used in all portable information communication equipment, electronic apparatus, electric automobiles and so on. Next generation energy storage systems, which are recently developed, utilize electrochemical principles and are exemplified by a Li based secondary cell and an electrochemical capacitor.

An electrochemical capacitor is an energy storage device that stores and supplies electric energy using the capacitor behavior caused by the electrochemical reaction between an electrode and an electrolyte. In addition, the electrochemical capacitor is a new concept energy storage power source that can rapidly store and supply a large amount of energy as being excellent in terms of energy density and power density, compared to the conventional electrolytic capacitor and the secondary cell, and thus recently caught many people's attention.

The electrochemical capacitor is expected to be applied as a back-up power source of the electronic apparatus, a pulse power source of the portable mobile communication equipment, and a high-output power source of a hybrid electric automobile in many industrial fields owing to the characteristics of being capable of supplying a large amount of current within a short time Among the electrochemical capacitors, the development of a super capacitor that has a larger energy density than that of the conventional capacitor comes into the spotlight.

An example of a representative super capacitor includes an electrical double layer capacitor (EDLC) using an electrical double layer formed between the electrode and the electrolyte, and a pseudo-capacitor that is generated from the faradaic reaction accompanied by the transportation of electric charges between the electrode and the electrolyte, such as the adsorption reaction of ions in the electrolyte on the surface of the electrode or the oxidation/reduction reaction of the electrode. The pseudo-capacitor is a super capacitor showing ultrahigh capacitance which has maximal capacitance 10-fold larger than that of the EDLC.

A metal oxide or conductive polymer is mainly used as an electrode material of the capacitor, and transition metal oxide materials come into the most significant spotlight as the electrode material of the super capacitor. In particular, ruthenium oxide exhibits very high specific capacitance, long operation time, high electrical conductivity, and excellent high-rate property in the aqueous electrolyte, and thus a research on the ruthenium oxide is the most actively in progress.

However, in case of using such an aqueous electrolyte, there is a disadvantage in that the operating voltage of the aqueous electrolyte is limited to 1V, and thus the energy density of the capacity is also limited. For this reason, the development of electrode materials such as vanadium oxide, manganese oxide or nickel oxide, cobalt oxide, and the like is vigorously carried out which can be used in an organic electrolyte whose operating voltage is at least 2.3V. However, these alternative electrode materials have not yet exhibited the electrochemical characteristics corresponding to those of ruthenium oxide so far.

In the meantime, as an attempt to improve the electrochemical characteristics of the metal oxide electrode, a global research is in progress on a carbon material-metal oxide composite electrode formed by mixing a metal oxide electrode material having a high specific capacitance and a carbon-based material having an excellent electrical conductivity According to reports, a carbon material-metal oxide composite electrode could be prepared by a pasting technique. A carbon material/metal oxide material in the form of paste can be prepared by adding the carbon-based material when synthesizing a metal oxide and then mixing a conductive material and a binder. Alternatively, a synthesized metal oxide, a conductive material and a binder are mixed with the carbon material into a paste form, and then the paste material is applied on a current collector.

However, this pasting technique entails a problem in that a manufacturing process of carbon material-metal oxide composite electrode is a multi-staged process that is very complicated and requires a relatively long time, and in that the conductive material and the binder are indispensably used but these materials are not actually involved in the electrochemical reaction exhibiting the specific capacitance of the electrode.

Thus, the development of a material capable of improving energy density and power density and increasing the specific surface area of the electrode several hundred-fold among the conditions of the super capacitor will be the most critical factor for the preoccupancy of the technology of the next-generation capacitor.

Therefore, Japanese Patent Laid-Open Publication No. 1993-198461 discloses a porous metal electrode for a capacitor manufactured by forming an aluminum layer on a porous conductive gas diffusion layer using an electroplating method. In addition, Japanese Patent Application No. 1993-045947 discloses a porous structure electrode for a capacitor manufactured by performing electroplating on a roamed resin and then thermally treating the electroplated resin. Japanese Patent Application No. 2007-066819 discloses an electrode for a capacitor manufactured by sequentially laminating a nickel-plated layer and a chrome-plated layer on a porous non-woven fabric.

However, these Japanese patent documents suffer from a drawback in that since the plating is performed on the matrix formed with pores to manufacture the electrode for a capacitor, there is a limitation in the specific surface area of the electrode and the control of the specific surface area is impossible.

Accordingly, the present inventors have made extensive efforts to solve the problems occurring in the prior art, and as a result, have found that a nano-porous electrode for a super capacitor is manufactured using an electrodeposition method accompanied by hydrogen generation so that the specific surface area of the electrode can be controlled by a simple process and can also be increased, thereby completing the present invention.

DISCLOSURE OF INVENTION

A main object of the present invention is to provide a nano-porous electrode for a super capacitor and a method of manufacturing the same, in which the charging and discharging capacity, energy density, power density, and the like of the capacitor can be improved by increasing the specific surface area of the electrode.

In order to achieve the above objects, the present invention provides a method of manufacturing a nano-porous electrode for a super capacitor, the method comprising the steps of: (a) preparing a conductive metal matrix; and (b) electrodepositing a metal-containing electrolyte on the conductive metal matrix thereby forming a porous metal structure or a porous metal oxide structure on the conductive metal matrix.

The present invention also provides a nano-porous electrode for a super capacitor, which is manufactured by said method and comprises a porous metal structure or a porous metal oxide structure formed on the conductive metal matrix, the porous metal structure or the porous metal oxide structure containing a metal selected from the group consisting of manganese, nickel, cobalt, tin, lead, ruthenium, and an alloy thereof, and a pseudo-capacitor comprising said nano-porous electrode for a super capacitor.

Other features and embodiments of the present invention will be more apparent from the following detailed descriptions and the appended claims.

BRIEF DESCRIPTION OF THE DRAWINGS

FIG. 2 is a photograph showing SEM images of a porous manganese/copper and manganese/tin electrode according to the present invention, wherein FIG. 2(a) shows a porous manganese/copper electrode image at ×250 magnification, FIG. 2(b) shows a manganese/copper dendritic structure image at ×25,000 magnification, and FIG. 2(c) shows a porous manganese/tin electrode image photographed ×250 magnification, and FIG. 2(d) shows a manganese/tin dendritic structure image at ×25,000 magnification.

FIG. 3 is a photograph showing SEM images of a porous nickel/tin electrode according to the present invention, wherein FIG. 3(a) shows a porous electrode image at ×250 magnification, and FIG. 3(b) shows a dendritic structure image at ×25,000 magnification.

FIG. 4 is a photograph showing SEM images of a porous cobalt/tin electrode according to the present invention, wherein FIG. 4(a) shows a porous electrode image at ×250 magnification, and FIG. 4(b) shows a dendritic structure image at ×5,000 magnification.

FIG. 5 is a photograph showing SEM images of a porous tin electrode according to the present invention, wherein FIG. 5(a) shows a porous electrode image at ×150 magnification, and FIG. 5(b) shows a dendritic structure image at ×3,000 magnification.

FIG. 6 is a photograph showing SEM images of a porous lead electrode according to the present invention, wherein FIG. 6(a) shows a porous electrode image at ×250 magnification, and FIG. 6(b) shows a dendritic structure image at ×5,000 magnification, and FIG. 6(c) shows a needle-shaped structure image at ×25,000 magnification after an annealing process.

FIG. 7 is a photograph showing SEM images of a porous ruthenium/copper electrode according to the present invention, wherein FIG. 7(a) shows a porous electrode image at ×250 magnification, and FIG. 7(b) shows a surface structure image at ×15,000 magnification, and FIG. 7(c) shows a modified structure image at ×20,000 magnification after a copper removing process.

EXPLANATION OF SYMBOLS

Figure 1:
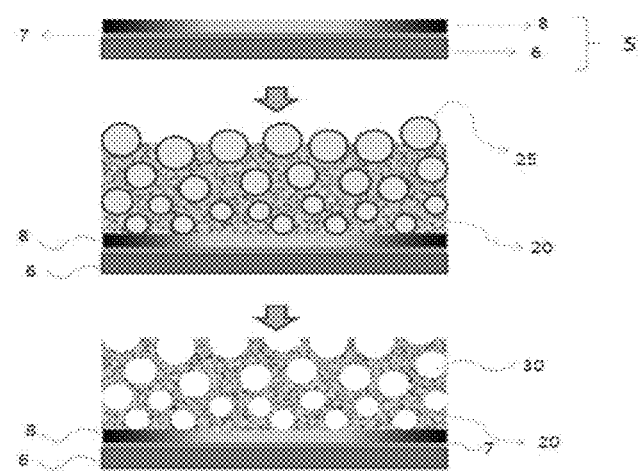
FIG. 1 is a diagram illustrating a process of manufacturing a nano-porous electrode for a super capacitor according to the present invention.

5: conductive metal matrix
6: substrate
7: adhesive layer
8: conductive metal
20: porous metal structure
25: hydrogen bubble
30: pore

BEST MODE FOR CARRYING OUT THE INVENTION

Unless defined otherwise, all technical and scientific terms used herein have the same meaning as commonly understood by one of ordinary skill in the art to which the invention pertains. Generally, the nomenclature used herein and the experiment methods which will be described later are those well known and commonly employed in the art.

In one aspect, the present invention is directed to a method of manufacturing a nano-porous electrode for a super capacitor, the method including the steps of:

(a) preparing a conductive metal matrix; and
(b) electrodepositing a metal-containing electrolyte on the conductive metal matrix thereby forming a porous metal structure or a porous metal oxide structure on the conductive metal matrix.

The method of manufacturing a nano-porous electrode for a super capacitor according to the present invention enables the manufacture of the electrode for the super capacitor using hydrogen generated by electrodeposition as a template, so that the specific surface area of the electrode can be improved, the electrode for the super capacitor can be firmly made due to an excellent strength by the electrodeposition, and also the capacitance, energy density, power density, and the like of the capacitor can be improved by increasing the specific surface area of the electrode.

Hereinafter, the present invention will be described with reference to the accompanying drawings.

As shown in FIG. 1, in the method of manufacturing a nano-porous electrode for a super capacitor according to the present invention, first, a conductive metal matrix 5 acting as a working electrode during the electrodeposition is prepared. The conductive metal matrix 5 may use platinum, silver, copper, gold, titanium, nickel, ruthenium, and a carbon material such as graphite, carbon nanotube, and fullerene. In addition, any substrate may be used in the present invention without limitation as long as it comprises a conductive metal 8. The conductive metal 8 is selected from among platinum, silver, copper, and gold.

Further, the conductive metal matrix 5 according to the present invention may be made of a flexible material such silicone, or glass. In case of using a substrate 6 made of silicone, glass or the like, the conductive metal matrix 5 may be prepared which is formed by applying a adhesive made of titanium, chrome or the like on the substrate 6 to thereby form a pressure sensitive adhesive layer 7 to improve the pressure-sensitive adhesion strength, and then forming a conductive metal 8 made of platinum, copper or the like on the pressure sensitive adhesive layer 7. In this case, any substrate 8 may be used in the present invention as long as it is made of silicone, glass, polyimide film, or other flexible film.

As such, after the conductive metal matrix 5 is prepared, the conductive metal matrix 5 is electrodeposited in a metal-containing electrolyte to thereby form a porous metal structure 20 or a porous metal oxide structure (not shown) on the conductive metal matrix 5. Any metal contained in the metal-containing electrolyte can be used in the present invention without limitation as long as it is a metal that can be used as a material of an electrode for a pseudo-capacitor in an aqueous solution. Preferably, the metal-containing electrolyte contains ruthenium, manganese, nickel, cobalt, tin, lead, or an alloy thereof in an aqueous solution.

The conductive metal matrix 5 is connected to a cathode and the platinum plate (not shown) is connected to an anode, and a voltage is applied across them to perform an electrolysis reaction using the electrolyte, so that metal particles, i.e., a metal such as manganese, nickel, cobalt, tin, lead, ruthenium, or an alloy thereof is deposited or generated together with hydrogen 25 on the conductive metal matrix 5 as the cathode by an electrophoresis phenomenon. In addition, the porous metal structure or the porous metal oxide structure is formed using the conductive metal matrix 5 as a working electrode, the platinum plate as a counter electrode, and a reference electrode selected depending on a material which it is desired to plate. In this case, the applied voltage is between −0.3 volt and −4.0 volt. If the applied voltage is less than −0.3 volt, there may occur a problem in that the plating itself is not performed. On the contrary, if the applied voltage exceeds −4.0 volt, a crack may occur on the porous metal structure or the porous metal oxide structure that is deposited on the conductive metal matrix.

As described above, the porous metal structure 20 or the porous metal oxide structure (not shown) is obtained which includes pores 30 formed on the surface of or inside the metal particles deposited on the conductive metal matrix 5 due to hydrogen generated during the electrodeposition. Here, the size of the pores in the porous metal structure 20 or the porous metal oxide structure varies depending on the plating time and the distance between the conductive matrix and the pores. That is, the size of the pores 30 is increased due to the binding and adhesion phenomenon of hydrogen bubbles 25 as the hydrogen bubble 25 is farther remote from the conductive matrix. The hydrogen bubble 25 is generated on the conductive metal matrix 5 by the reaction of the cathode, and continues to be generated from the conductive matrix and the electrolyte during the plating. Thus, since metal ions are difficult to be present at a region where the hydrogen bubble 25 is present, the structure is not formed at the region and the porous metal structure 20 or the porous metal oxide structure is formed between the hydrogen bubbles on the conductive metal matrix 5.

The pores may be formed in various manners depending on a metal material contained in the electrolyte, a concentration of the metal material, and the like, and thus the size of the pores may be formed in a range between several tens of nanometers and several tens of micrometers. Preferably, the porous metal structure or the porous metal oxide structure comprises pores with an average diameter of from 10 nm to 10 μm formed therein, is formed as a dendritic structure having an average size of from 5 nm to 1 μm and has a thickness of from 10 to 100 μm.

In addition, in the case where the porous metal structure or the porous metal oxide structure is formed using the electrolyte containing manganese, nickel, cobalt, tin, lead, ruthenium, or an alloy thereof, a dendritic structure having a protrusion shape, a needle shape, a particle-agglomerated shape, or a branch shape can be obtained in the electrode.

A conventional metal electrode of a single-layered film type is high in stability due to activation reaction on only the surface thereof, but exhibits a low performance due to a low specific surface area. On the other hand, the electrode including porous metal structure or the porous metal oxide structure of the present invention has the specific surface area that cannot be compared with the conventional metal electrode of a single-layered film type since a structure constituting the pores and the electrode is formed as a number of dendritic structures having different shapes depending on materials, thereby improving the charging and discharging capacity, energy density, power density, and the like of the capacitor.

In the formation of the porous metal structure 20 or the porous metal oxide structure on the conductive metal matrix 5 using the electrodeposition method, the size of the pores of the porous metal structure 20 or the porous metal oxide structure or the size of the dendritic structure may be controlled by adjusting at least one selected from the group of consisting of a metal concentration of the metal-containing electrolyte and a metal kind of the metal-containing electrolyte. In addition, the size of the pores of the porous metal structure 20 or the porous metal oxide structure or the size of the dendritic structure may be controlled by adjusting a temperature of the electrolyte during the electrodeposition, the magnitude of the voltage applied, and a concentration of an additive such as sulfuric acid and ammonium chloride. Thus, the porous metal structure 20 or the porous metal oxide structure, or the dendritic structure can be used as means for the development of the electrode for a novel capacitor.

For example, the size of the pores of the porous metal structure 20 or the porous metal oxide structure is increased due to the binding and adhesion phenomenon of hydrogen bubbles 25 as the plating time is further extended or the hydrogen bubble 25 is farther remote from the conductive metal matrix 5. Thus, the size of the pores may be controlled by adjusting the plating time, the generation of the hydrogen bubbles, and the binding and adhesion position of the hydrogen bubbles. In addition, if the metal contained in the electrolyte is tin, the surface of the porous metal structure or the porous metal structure is deposited in a protrusion shape. If the metal contained in the electrolyte is lead, the surface of the porous metal structure or the porous metal structure is deposited in a needle shape. In addition, if the metal contained in the electrolyte is copper, the surface of the porous metal structure or the porous metal structure is deposited in a protrusion shape in which a number of non-crystalline particles are agglomerated. Besides, if the metal contained in the electrolyte is a binary or ternary alloy, the surface of the porous metal structure or the porous metal structure is deposited in various dendritic structure shapes depending on the materials contained in the electrolyte. Thus, the size and shape of the pores can be controlled depending on the concentration and kind of the metals contained in the electrolyte.

Further, the electrodepositing step (b) may further include an annealing step and/or a plasma ion implantation step to obtain a metal oxide layer for use in the electrode for a super capacitor.

The porous metal oxide structure refers to a structure that the surface and/or the inside of the porous metal structure are/is oxidized.

In addition, in the case where the porous metal structure or the porous metal oxide structure is formed using an electrolyte containing two or more metals, if the metals contained in the electrolyte is a material that is unsuitable for the manufacture of the capacitor, the electrodepositing step (b) may further include an etching step and/or electrochemical separation (de-alloying) step in order to remove only the unsuitable material. This additional step leads to a great increase in the specific surface area of the electrode.

The method of manufacturing a nano-porous electrode for a super capacitor according to the present invention enables the manufacture of the porous metal structure or the porous metal oxide structure in which nano-sized pores are formed by uniformly dispersing hydrogen bubbles by using the electrodeposition method accompanied by hydrogen generation, so that the amount of metal used is minimized to greatly reduce the manufacturing cost, as well as a porous electrode whose various sizes and shapes of pores are controlled can be manufactured, compared to the electrode manufactured using a conventional porous substrate.

In another aspect, the present invention is directed to a nano-porous electrode for a super capacitor, which is manufactured by said method and comprises a porous metal structure or a porous metal oxide structure formed on the conductive metal matrix, the porous metal structure or the porous metal oxide structure containing a metal selected from the group consisting of manganese, nickel, cobalt, tin, lead, ruthenium, and an alloy thereof.

The porous metal structure 20 or the porous metal oxide structure can be more stably used since it is formed as a multi-layered structure using a single metal such as manganese, nickel, cobalt, tin, lead, or ruthenium, preferably an alloy thereof.

In still another aspect, the present invention is directed to a pseudo-capacitor including said nano-porous electrode for a super capacitor.

The pseudo-capacitor may be manufactured by a method that is well-known to a person skilled in the art, except that the nano-porous electrode for a super capacitor manufactured by the present invention is used.

In addition, the nano-porous electrode for a super capacitor according to the present invention can also be applied to energy storage devices such as solar cells, fuel cells, secondary cells, and various kinds of sensors, besides the super capacitor.

EXAMPLES

Hereinafter, the present invention will be described in further detail with reference to examples. It will be obvious to those skilled in the art that these examples are illustrative purposes only and are not to be construed to limit the scope of the present invention.

Example 1

Manufacture of Nano-Porous Electrode Using Manganese Oxide and Alloy

A titanium layer was formed into a thickness of 10 nm on a silicone matrix by sputtering titanium. Thereafter, a conductive platinum substrate in which a platinum layer was formed into a thickness of 200 nm on the titanium layer by sputtering titanium was used as a conductive metal matrix.

Figure 2:
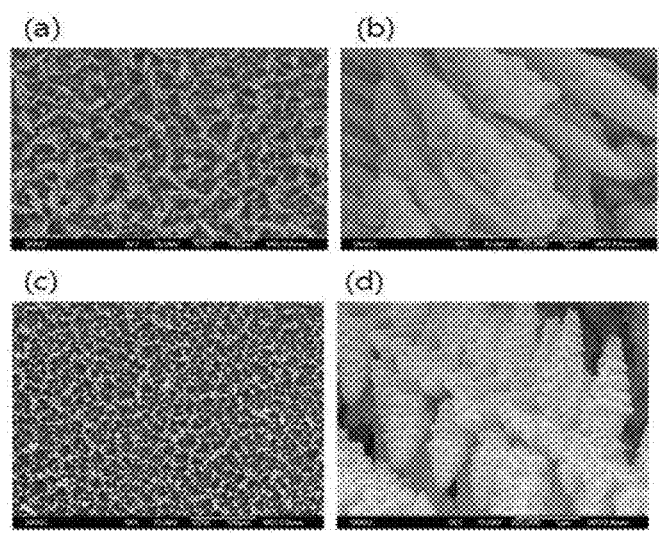

The conductive platinum substrate was used as a working electrode and the platinum plate was used as a counter electrode to form a porous manganese-containing structure on the manufactured conductive platinum substrate. A distance between a cathode and an anode was maintained to be 2 cm, and an Ag/AgCl reference electrode was used. In addition, $MnSO_4 \cdot H_2O$, and $NH_4Cl$ were contained as an electrolyte. In this case, concentrations of the electrolytes were 0.2M $MnSO_4 \cdot H_2O$, and 1M $NH_4Cl$, respectively, and copper and tin were added thereto at a concentration of 0.01M. The conductive platinum substrate was immersed in 20 ml of the prepared electrolyte, and electrodeposition was performed on the conductive platinum substrate for 1 minute by applying a voltage of −3 volt across the conductive platinum substrate, to deposit a porous manganese structure, a porous manganese/copper structure and a porous manganese/tin structure on the conductive platinum substrate, thereby manufacturing a porous manganese electrode, a porous manganese/copper electrode and a porous manganese/tin electrode (FIG. 2).

Example 2

Manufacture of Nano-Porous Electrode Using Nickel Oxide and Alloy

Figure 3:
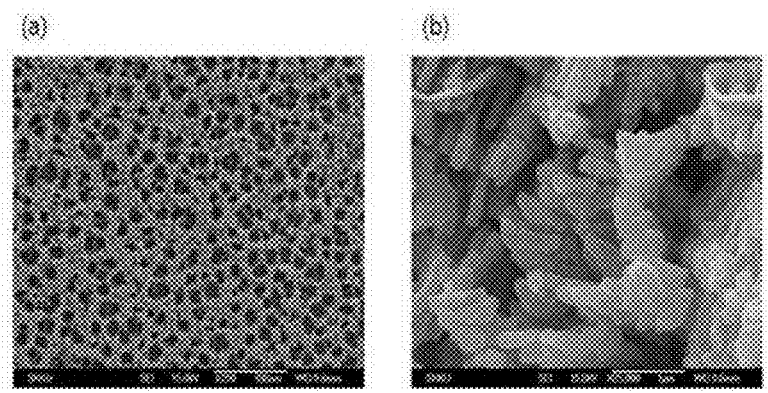

The conductive platinum substrate was used as a working electrode and the platinum plate was used as a counter electrode to form a porous nickel-containing structure on the conductive platinum substrate manufactured in Example 1. In this case, a distance between a cathode and an anode was maintained to be 2 cm, and an Ag/AgCl reference electrode was used. In addition, $NiCl_2 \cdot 6H_2O$, $SnCl_2 \cdot 2H_2O$, and $H_2SO_4$ were contained as an electrolyte. In this case, a concentration of the electrolyte was 0.2M $NiCl_2 \cdot 6H_2O$, 0.01M $SnCl_2 \cdot 2H_2O$, and 1M $H_2SO_4$, respectively. The conductive platinum substrate was immersed in 20 ml of the prepared electrolyte, and electrodeposition was performed on the conductive platinum substrate for 1 minute by applying a voltage of −3 volt across the conductive platinum substrate to deposit a porous nickel/tin structure on the conductive platinum substrate, thereby manufacturing a porous nickel/tin electrode (FIG. 3).

Example 3

Manufacture of Nano-Porous Electrode Using Cobalt Oxide and Alloy

The manufacture of the nano-porous electrode in Example 3 was performed in the same method as that in Example 2 except the following process. $CoSO_4.2H_2O$, $SnCl_2.2H_2O$ and $H_2SO_4$ were contained as an electrolyte. In this case, concentrations of the electrolytes were 0.2M $CoSO_4.2H_2O$, 0.2M $SnCl_2.2H_2O$, and 1M $H_2SO_4$, respectively. A porous electrode formed with a porous cobalt/tin structure was manufactured. An annealing (oxidation) process was performed on the manufactured porous cobalt/tin electrode at 300° C.

Figure 4:
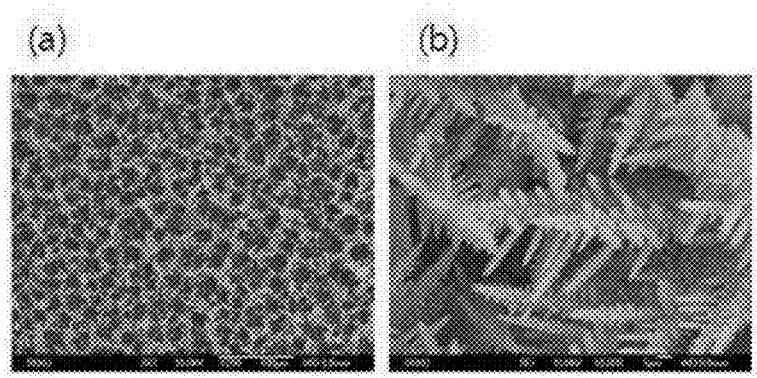

As a result, it could be found that a porous cobalt/tin structure was formed as shown in FIG. 4(a), and the porous cobalt/tin structure was formed as a number of dendritic structures of a protrusion shape as shown in FIG. 4(b).

Example 4

Manufacture of Nano-Porous Electrode Using Tin Oxide and Alloy

The manufacture of the nano-porous electrode in Example 4 was performed in the same method as that in Example 2 except the following process. That is, $SnCl_2.2H_2O$ or $SnCl_2.5H_2O$ and $H_2SO_4$ were contained as an electrolyte. In this case, concentrations of the electrolytes were 0.1M $SnCl_2.2H_2O$ or 0.1M $SnCl_2.5H_2O$, and 1M $H_2SO_4$, respectively. A porous electrode formed with a porous tin structure was manufactured.

Figure 5:
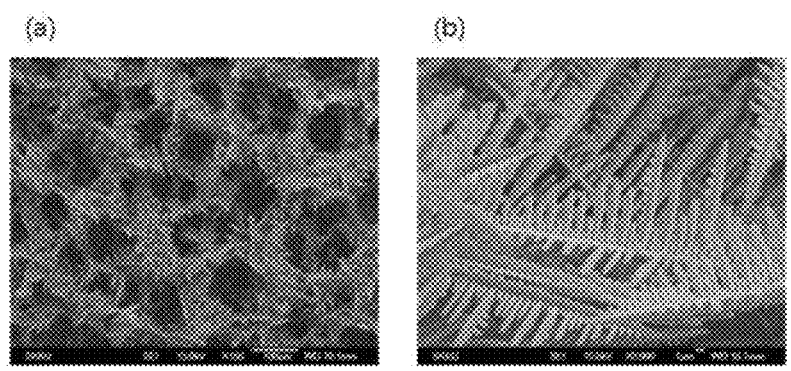

As a result, it could be found that a porous tin structure was formed as shown in FIG. 5(a), and the porous tin structure was formed as a number of dendritic structures of a protrusion shape as shown in FIG. 5(b).

Example 5

Manufacture of Nano-Porous Electrode Using Lead Oxide and Alloy

The manufacture of the nano-porous electrode in Example 5 was performed in the same method as that in Example 2 except that a porous electrode formed with a porous lead structure was prepared by using 0.01M $Pb(ClO_4)_2$, 1.2M $HClO_4$ and 0.01M sodium citrate.

Figure 6:
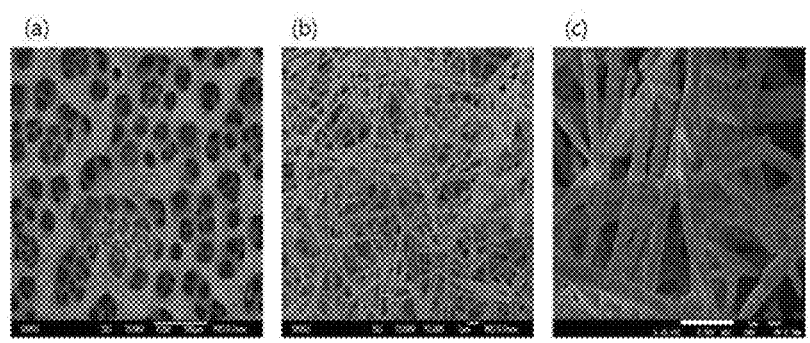

As a result, it could be found that a porous lead structure having a needle-shaped dendritic structure was formed as shown in FIG. 6(a), and an oxidation layer was formed on the porous structure after an annealing process as shown in FIG. 6(c).

Example 6

Manufacture of Nano-Porous Electrode Using Ruthenium Oxide and Alloy

The manufacture of the nano-porous electrode in Example 6 was performed in the same method as that in Example 2 except the following process. That is, $RuCl_3.2H_2O$, $CuSO_4.5H_2O$, and $H_2SO_4$ were contained as an electrolyte. In this case, concentrations of the electrolytes were 0.02M $RuCl_3.2H_2O$, 0.01M $CuSO_4.5H_2O$, and 1M $H_2SO_4$, respectively. A porous electrode formed with a porous ruthenium/copper structure was manufactured, and then copper was electrochemically separated from the porous structure using 0.1M $H_2SO_4$ to remove copper that is unsuitable as a material of the electrode for the capacitor.

Figure 7:
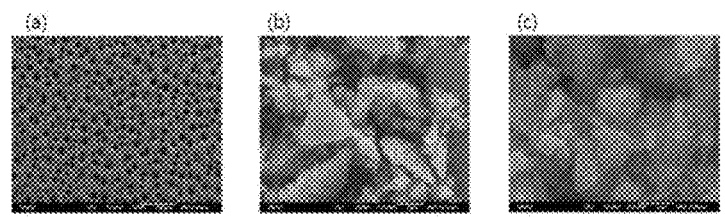

As a result, it could be found that a porous ruthenium/copper structure having a new shape different from that in other Examples was formed as shown in FIGS. 7(a) and 7(b), and it could be found that a porous ruthenium structure was formed which has the specific surface area further increased at a portion where copper was removed after removal of copper as shown in FIG. 7(c).

Comparative Example 1

Manufacture of Thin Film Type Electrode

The manufacture of the electrode in Comparative Example 1 was performed in the same method as that in Example 1 except the following process. The conductive substrate was immersed in an electrolyte containing 0.01M $RuCl_3.2H_2O$, and 1M $NH_4Cl$, and electrodeposition was performed on the conductive substrate for 3 minutes by applying a voltage of −3 volt across the conductive substrate to thereby manufacture a thin film type electrode.

Test Example 1

Cyclic Voltammetry Measurement

A cyclic voltammetry measurement (Electrochemical Impedance Analyzer, ZAHNER®) was performed using the ruthenium oxide nano-porous electrode manufactured in Example 6. The measurement method was as follows. A cyclic voltammetry was measured at different scan rates in 0.1M $H_2SO_4$ electrolyte using a porous metal structure as a working electrode and a platinum plate as a counter electrode, an Ag/AgCl reference electrode.

Figure 8:
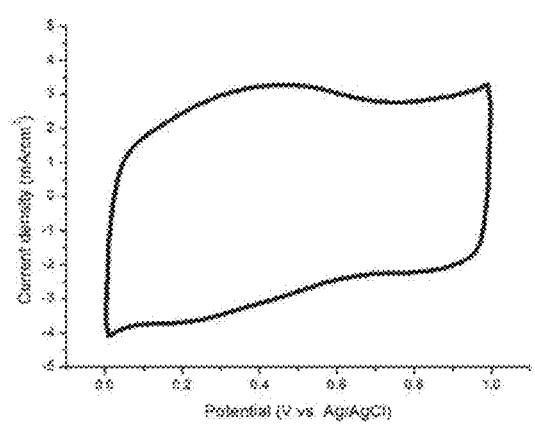
FIG. 8 is a graph showing a result of the cyclic voltammetry test of a porous ruthenium/copper electrode according to the present invention.

As a result, it could be found that since an oxidation peak appeared at 0.4V, and a reduction peak appeared at a potential region of about 0.3V as shown in FIG. 8, a material of the electrode used in the measurement was ruthenium.

Test Example 2

Charging and Discharging Measurement

The charging and discharging performance was measured using the ruthenium oxide-containing nano-porous electrode manufactured in Example 6 (Eelectrochemical Impedance Analyzer, ZAHNER®). The measurement method was as follows. The charging and discharging performance was measured at different current values (i.e., 1 A/g to 10 A/g) in 0.1M $H_2SO_4$ electrolyte using a porous metal structure as a working electrode and a platinum plate as a counter electrode, an Ag/AgCl reference electrode.

Figure 9:
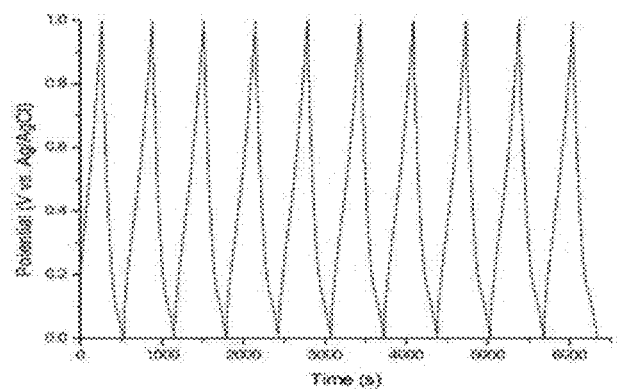
FIG. 9 is a graph showing a result of the charging and discharging test of a porous ruthenium/copper electrode according to the present invention.

As a result, it could be found that the charging and discharging time was constant over time, and thus the nano-porous electrode had stability as shown in FIG. 9.

Test Example 3

Specific Capacitance Measurement

Figure 10:
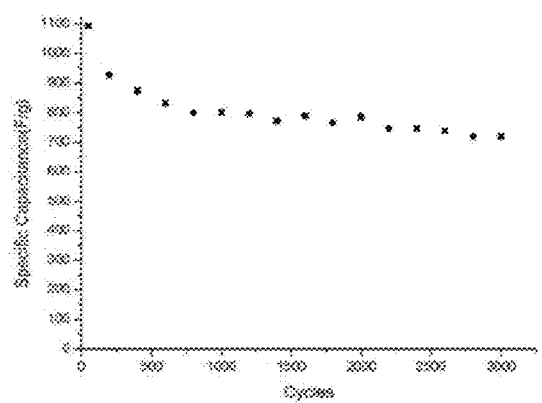
FIG. 10 is a graph showing a result of the specific capacitance test of a porous ruthenium/copper electrode according to the present invention.

The specific capacitance performance of the ruthenium oxide-containing nano-porous electrode manufactured in Example 6 was measured by calculating the discharging time of the specific capacitance and the value of the current applied through a graph measured in the cyclic voltammetry test As a result, it could be found that a porous ruthenium-copper metal structure showed a specific capacitance of 1100 F/g, and it maintained a specific capacitance of about from 750 to 800 F/g after the charging and discharging was performed for 3,000 cycles as shown in FIG. 10.

Test Example 4

Cyclic Voltammetry Measurement of Ruthenium Oxide-Containing Nano-Porous Electrode and Film Type Ruthenium Electrode The cyclic voltammetry was measured to compare the ruthenium oxide-containing nano-porous electrode manufactured in Example 6 with the thin-film type electrode of Comparative Example 1. The measurement method was performed in the same method as Test Example 1.

Figure 11:
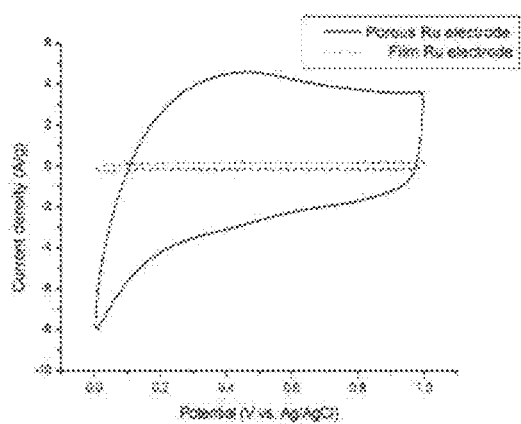
FIG. 11 is a graph showing a result of the cyclic voltammetry test of a porous ruthenium/copper electrode and a film-shaped ruthenium electrode according to the present invention.

As a result, it could be found that there was a difference in CV valves measured at the same weight valve, i.e., the CV value of the nano-porous electrode is about 40-50 times larger than that of the film type electrode as shown in FIG. 11.

INDUSTRIAL APPLICABILITY

As described above, the method of manufacturing the nano-porous electrode for a super capacitor according to the present invention.

The method of manufacturing a nano-porous electrode for a super capacitor according to the present invention enables the manufacture of a nano-porous electrode using hydrogen generated by electrodeposition as a template to minimize the amount of metal used, so that electrode manufacturing costs can be greatly reduced, the specific surface area of the electrode can be controlled by a simple process, and also the charging and discharging capacity, energy density, power density, and the like of a capacitor can be improved by increasing the specific surface area.

Although the present invention has been described in detail with reference to the specific features, it will be apparent to those skilled in the art that this description is only for a preferred embodiment and does not limit the scope of the present invention.

Thus, the substantial scope of the present invention will be defined by the appended claims and equivalents thereof.

The invention claimed is:

1. A method of manufacturing a nano-porous electrode for a super capacitor, the method comprising:
   (a) preparing a conductive metal matrix;
   (b) electrodepositing a porous metal structure on the conductive metal matrix by immersing the conductive metal matrix in an aqueous electrolyte solution containing at least one metal ion and applying a voltage between −0.3 volt and −4.0 volt using the conductive metal matrix connected to a cathode and an anode to perform an electrolysis reaction so that hydrogen bubbles are generated and the at least one metal ion is reduced to form metal particles and depositing the metal particles on the conductive metal matrix thereby forming the porous metal structure between the hydrogen bubbles on the conductive metal matrix, and
   optionally, oxidizing the porous metal structure to form a porous metal oxide structure,
   wherein the aqueous electrolyte solution containing at least one metal ion is selected from the group of consisting of manganese-containing electrolyte solution, cobalt-containing electrolyte solution, lead-containing electrolyte solution, ruthenium-containing electrolyte solution, and electrolyte solution containing mixtures of two or more of manganese, cobalt, lead, and ruthenium, and
   wherein the porous metal structure or porous metal oxide structure comprises (i) pores having an average diameter of from 10 nm to 10 μm formed on surface of or inside the metal particles deposited on the conductive metal matrix, (ii) a dendritic structure having an average size of from 5 nm to 1 μm, and (iii) a thickness of from 10 μm to 100 μm.

2. The method of claim 1, wherein the conductive metal matrix comprises material selected from the group consisting of platinum, silver, copper, gold, titanium, nickel, ruthenium, graphite, carbon nanotubes, fullerene, and mixtures of two or more of the foregoing.

3. The method of claim 1, wherein a size of pores of the porous metal structure or the porous metal oxide structure is controlled by adjusting at least one selected from the group of consisting of a metal concentration of the aqueous electrolyte solution containing at least one metal ion, a metal kind of the aqueous electrolyte solution containing at least one metal ion, a temperature of the aqueous electrolyte solution during the electrodeposition, an applied voltage, and an additive concentration.

4. The method of claim 1, further comprising an etching step and/or electrochemical separation (de-alloying) step to remove materials unsuitable for use in the super capacitor and to increase a specific surface area of the electrode, after step (b).

5. The method of claim 1, wherein said oxidizing comprises an annealing step and/or a plasma ion implantation step.

6. The method of claim 1, wherein the porous metal structure or the porous metal oxide structure has a protrusion shape, needle shape, or a combined shape thereof.

* * * * *